United States Patent
Tokuda et al.

(10) Patent No.: US 7,835,428 B2
(45) Date of Patent: Nov. 16, 2010

(54) METHOD AND DEVICE FOR FACSIMILE COMMUNICATION CAPABLE OF COMPLETING COMMUNICATION EVEN WHEN THERE IS DISRUPTION TO COMMUNICATION

(75) Inventors: Masashi Tokuda, Yokohama (JP); Hirofumi Nishi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1072 days.

(21) Appl. No.: 11/501,633

(22) Filed: Aug. 9, 2006

(65) Prior Publication Data
US 2007/0036206 A1 Feb. 15, 2007

(30) Foreign Application Priority Data
Aug. 9, 2005 (JP) .............................. 2005-230812

(51) Int. Cl.
*H04B 1/38* (2006.01)
*H04L 5/16* (2006.01)

(52) U.S. Cl. .................. 375/222; 375/219; 375/316; 375/354; 375/357; 375/363; 375/364; 375/365; 375/366

(58) Field of Classification Search ......... 375/219–220, 375/222, 354–360, 362–370, 232; 455/73; 358/409
See application file for complete search history.

(56) References Cited

U.S. PATENT DOCUMENTS

| | | | | | |
|---|---|---|---|---|---|
| 4,876,740 | A | * | 10/1989 | Levine et al. | 455/422.1 |
| 5,214,637 | A | * | 5/1993 | Sridhar et al. | 370/286 |
| 5,678,135 | A | * | 10/1997 | Fukui et al. | 399/77 |
| 5,745,154 | A | * | 4/1998 | Nishizawa | 347/250 |
| 5,903,602 | A | * | 5/1999 | Torkkel | 375/222 |
| 6,236,469 | B1 | * | 5/2001 | Watanabe et al. | 358/468 |
| 6,314,170 | B1 | * | 11/2001 | Noguchi et al. | 379/93.32 |
| 6,400,802 | B1 | * | 6/2002 | Legare | 379/3 |
| 6,452,963 | B1 | * | 9/2002 | Lee | 375/222 |
| 6,728,308 | B1 | * | 4/2004 | Chu et al. | 375/222 |
| 6,760,368 | B1 | * | 7/2004 | Arai et al. | 375/222 |

FOREIGN PATENT DOCUMENTS

JP 3032239 2/2000

\* cited by examiner

*Primary Examiner*—Mohammad H Ghayour
*Assistant Examiner*—Sophia Vlahos
(74) *Attorney, Agent, or Firm*—Cooper & Dunham LLP

(57) ABSTRACT

A MODEM device includes a detector configured to detect a synchronization signal transmitted from a source MODEM in a resynchronization process of a primary channel and a timer configured to count up starting from a beginning of a detection of the synchronization signal, and send information to forcibly move into a receiving mode for receiving image data when a time period from the beginning to a completion of the detection of the synchronization signal exceeds a predetermined time period.

14 Claims, 6 Drawing Sheets

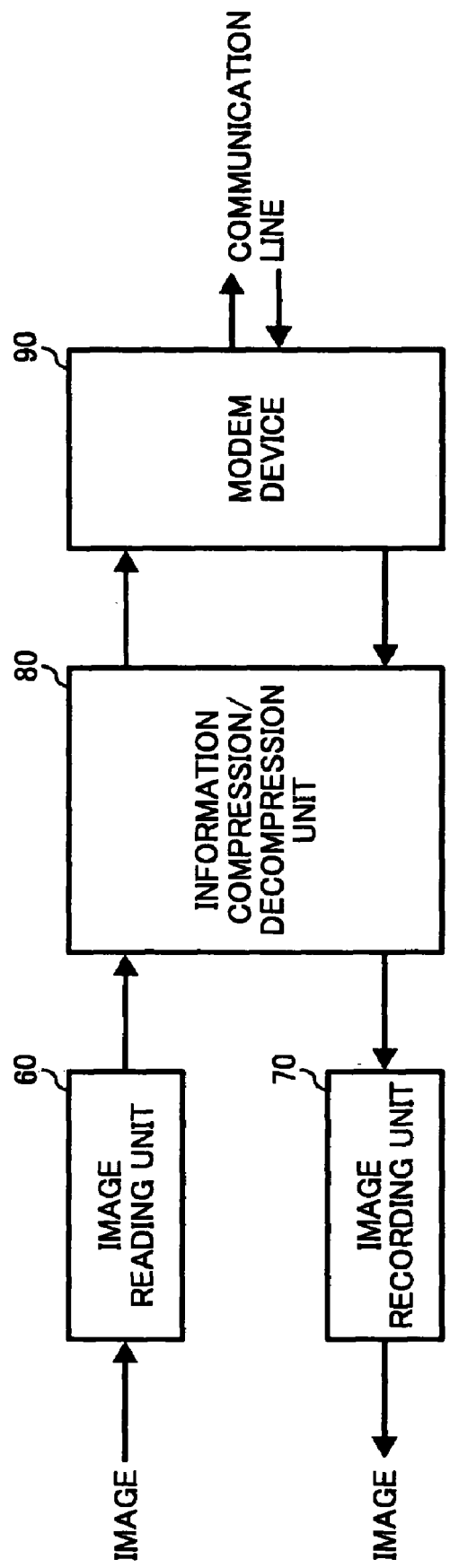

METHOD AND DEVICE FOR FACSIMILE COMMUNICATION CAPABLE OF COMPLETING COMMUNICATION EVEN WHEN THERE IS DISRUPTION TO COMMUNICATION

TECHNICAL FIELD

This disclosure relates to a method and device for facsimile communication capable of safe and reliable communication.

BACKGROUND

Telecommunication between facsimile apparatuses is generally performed in accordance with a half-duplex channel communication protocol governed by V.34 recommendation of ITU-T (International Telecommunication Union Telecommunication Standardization Sector). In the V.34 recommendation, a communication format is determined in phase 1. A symbol rate and a carrier frequency are determined in phase 2. In phase 3, an equalizer training of a primary channel is performed.

After phase 3, a control channel is started up. A signal speed of the primary channel is determined by exchanging modulation parameter sequence signals MPh. Next the primary channel is resynchronized. A source MODEM sends a S signal, a Sbar signal, a PP signal for synchronization and a sequence-B1 signal. Following them, the source MODEM sends image data.

The recipient MODEM receives signals from a start of a resynchronization to a completion of the reception of image information. When a plurality of document papers are to be sent, a series of steps (i.e., a resynchronization of a primary channel, a transmission of the image information and a resynchronization of the control channel) are repeated.

In the resynchronization of the control channel, when the documents are received correctly, a MCF (message confirmation) message is returned. When the received communication includes an error, a PPR (partial page response) message is returned so that the information which was not received correctly can be transmitted again. When the source MODEM receives the PPR signal, only the portion of the information containing an error is transmitted again.

When the source MODEM receives the MCF signal, the source MODEM transmits a next page if the next page is followed. If the next page is not followed, the source MODEM performs a disconnection operation by transmitting a DCN (disconnect) signal.

In the resynchronization of the primary channel, the recipient MODEM roughly adjusts a clock of the recipient MODEM to synchronize with a clock of the source MODEM by detecting the S signal and a transition from the S signal to the Sbar signal. Further, the recipient MODEM continues to synchronize using the PP signal. For this reason, the MODEM sequence can not proceed until detection of the S signal and the transition from the S signal to the Sbar signal is completed.

In the half-duplex channel communication, recovery procedures are provided up to phase 3 of the V.34 recommendation. However, a recovery procedure for the resynchronization of the primary channel is not provided. As a result, if an unintentional disturbance such as instant shutoff occurs while the recipient MODEM receives the S signal, the recipient MODEM is held in a waiting state until reception of the S signal is complete. Meanwhile, the source MODEM moves to a sequence of resynchronization of the control channel after transmission of the primary channel.

Thus, the source MODEM and the recipient MODEM can not proceed if communication line trouble (for example the instant shutoff while the source MODEM transmits S signal) occurs. The host CPU performs a disconnection process forced due to timeout, and the facsimile communication terminates.

BRIEF SUMMARY

In an aspect of this disclosure, there is provided a novel MODEM device which includes a detector configured to detect a synchronization signal transmitted from a source MODEM in a resynchronization process of a primary channel, and a timer configured to count up starting from a beginning of a detection of the synchronization signal and send information to move forcibly into a receiving mode for receiving image information data when a time period from the beginning to a completion of the detection of the synchronization signal exceeds a predetermined time period.

In another aspect of this disclosure, there is provided a novel method for controlling a MODEM device using half-duplex channel communication which includes starting a timer to count up from a beginning of a detection of a synchronization signal, detecting the S signal and the transition from the S signal to the Sbar signal which is a synchronization signal, checking an event of the transition from the S signal to the Sbar signal, moving forcibly into a receiving mode to receive image data when a period from the beginning to a completion of the detection of the synchronization signals exceeds a predetermined time period, and receiving image data after receiving a PPh signal and a sequence B1 signal during the receiving mode.

BRIEF DESCRIPTION OF THE DRAWINGS

A more complete appreciation of other aspects, features and advantages will be better understood by reference to the following detailed description when considered in connection with the accompanying drawings, wherein:

FIG. 6 illustrates of a facsimile apparatus according to an exemplary embodiment the present disclosure.

DETAILED DESCRIPTION OF PREFERRED EMBODIMENTS

Figure 1:
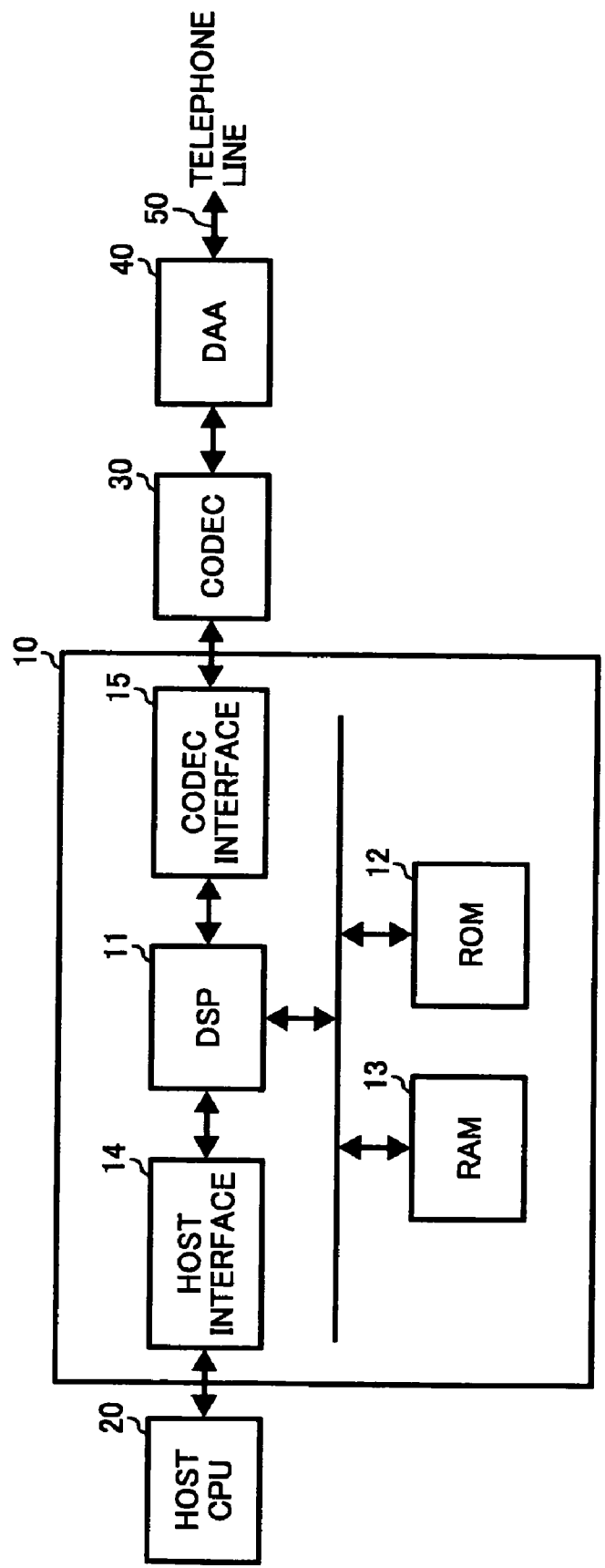
FIG. 1 illustrates a block diagram of a MODEM device for a facsimile according to an exemplary embodiment of the present disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a MODEM device according to exemplary embodiments are described.

FIG. 1 illustrates a block diagram of a MODEM (modulator-demodulator) device for a facsimile according to an exemplary embodiment of the present disclosure. The MODEM device includes a MODEM-LSI (large scale integrated circuit) 10, a host CPU (central processing unit) 20, a CODEC (coder-decoder) 30 and a DAA (data access arrangement) 40. The MODEM-LSI 10 includes a DSP (digital signal processor) 11, a ROM (read only memory) 12, a RAM (random access memory) 13, a host interface 14 and a CODEC interface 15.

The DSP 11 performs modulation operation in which data is modulated to signals for a telephone line, demodulation operation in which the signal is demodulated to data, sequence control operation for training and communication of control information and image information data with the host CPU 20. The ROM 12 stores one or more programs which the DSP 11 executes and the RAM 13 temporarily stores data for execution of the program. The host interface 14 is connected to the host CPU 20. The CODEC interface 15 is connected to the CODEC 30.

The host CPU 20 communicates with the MODEM-LSI 10 with the facsimile transmission data, monitors status information indicated by the MODEM-LSI 10 and controls operation by sending control information.

The CODEC 30 includes an A/D (analog/digital) modulation block and a D/A modulation block. The A/D modulation block transforms analog data to digital data and the D/A modulation block transforms digital data to analog data. The DAA is an interface circuit with a telephone line 50 and includes a hybrid circuit, a ring detection circuit, a relay, a transformer and a protection circuit.

The DSP 11 of the MODEM-LSI 10 executes the program stored in the ROM 12. In a case of facsimile reception based on the V.34 recommendation, the CPU 20 sets a V.34 facsimile receiving mode and performs signal communication based on the V.34 recommendation in accordance with the program stored in the ROM 12. A sequence of the signal communication will be described.

Figure 2:
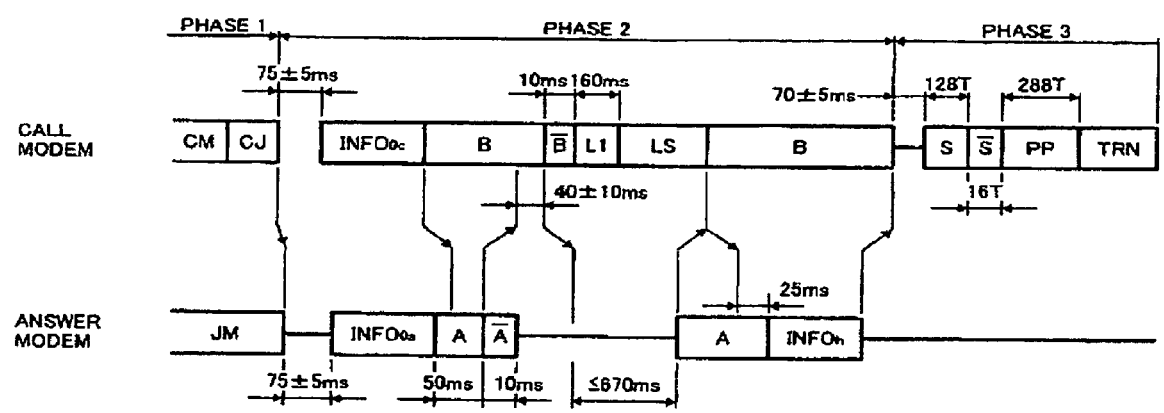
FIGS. 2 to 4 illustrate sequences of signal communication using half-duplex channel communication which complies with the V.34 recommendation.
Figure 3:
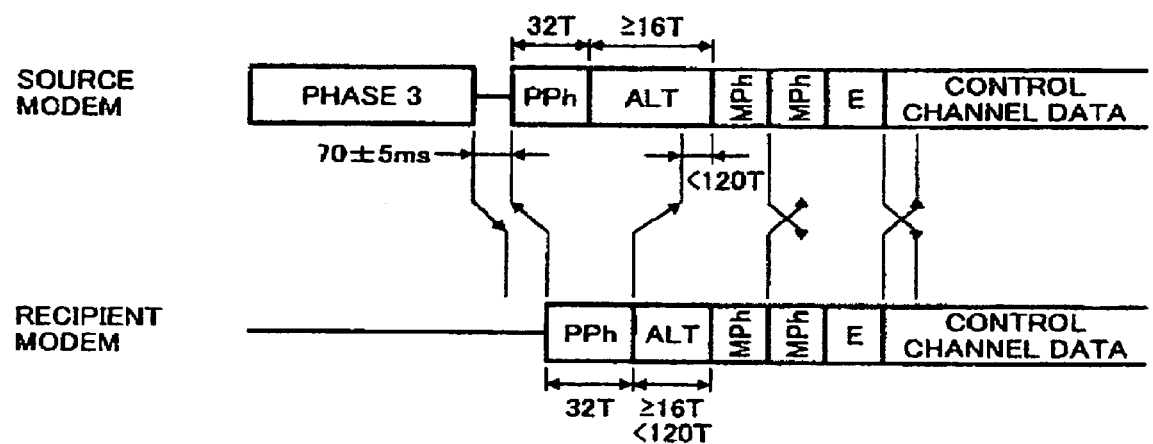
Figure 4:
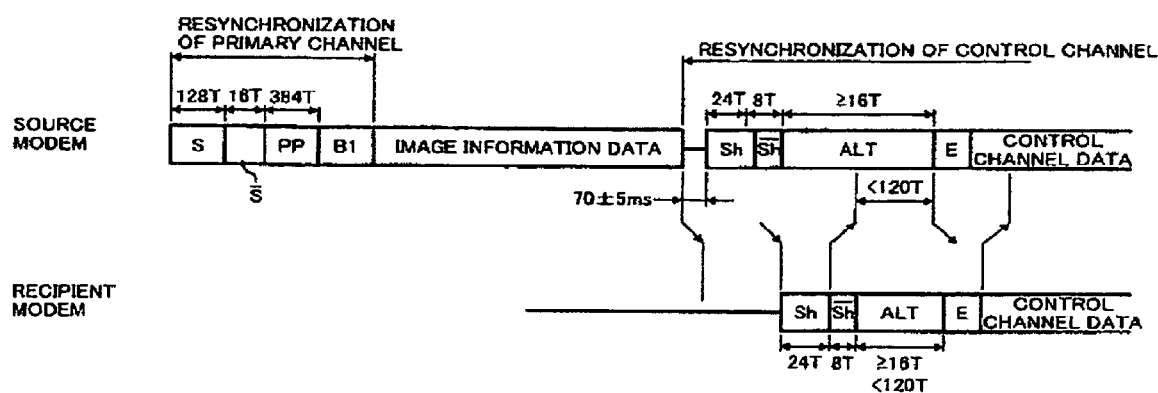

FIGS. 2 to 4 illustrate sequences of the signal communication using half-duplex channel communication in accordance with the V.34 recommendation. A communication rule is determined in phase 1 of FIG. 2. A symbol rate and a carrier frequency are determined in phase 2. In phase 3, equalizer training of a primary channel is performed. After the phase 3, a control channel is started up as shown in FIG. 3. A signal speed of the primary channel is determined by exchanging modulation parameter sequence signals MPh.

Next, the primary channel is resynchronized as shown in FIG. 4. The source MODEM sends a S signal of 128 symbols, a Sbar signal of 16 symbols and a PP signal of 384 symbols for synchronization and sends a sequence-B1 signal. Following them, the source MODEM sends image information data.

The recipient MODEM receives signals from the start of the resynchronization of the primary channel to the completion of the reception of the image information. When a plurality of document papers are to be sent by a page transmission mode, a series of steps (i.e., resynchronization of the primary channel, transmission of the image information and resynchronization of the control channel) are repeated.

Following resynchronization of the control channel, a MCF (message confirmation) message is returned when the documents are received correctly. When an error is included, a PPR (partial page response) message is returned so that the information which was not received correctly can be transmitted again. When the source MODEM receives the PPR signal, only an error portion of the information is transmitted again. When the source MODEM receives the MCF signal, the source MODEM transmits a next page if the next page follows. If there is not a next page which follows, the source MODEM performs a disconnection operation by transmitting a DCN (disconnect) signal.

At the resynchronization of the primary channel, the recipient MODEM roughly adjusts a clock of the recipient MODEM to synchronize with a clock of the source MODEM by detecting the S signal and a transition from the S signal to the Sbar signal. Further, the recipient MODEM continues to synchronize using the PP signal. The S signal is 128 symbols, the Sbar signal is 16 symbols and the sequence PP signal is 384 symbols.

It is necessary that the recipient MODEM recognizes a transition timing from the S signal to the Sbar signal, in order to accurately receive the B1 signal following the PP signal from a beginning. For this reason, the MODEM sequence does not proceed until transition from the S signal to the Sbar signal is detected. If an unintentional disturbance such as an instant shutoff occurs while the recipient MODEM is receiving the S signal, the recipient MODEM may be held in a waiting state of the S signal.

Meanwhile, the source MODEM moves to a sequential process of the resynchronization of the control channel as shown in FIG. 4 after the transmission of the primary channel. In this state, the source MODEM transmits a Sh signal, a Shbar signal and a sequence-ALT signal and waits for a Sh signal or a PPh signal from the recipient MODEM.

As described, the source MODEM and the recipient MODEM can not proceed if an unintentional disturbance such as an instant shutoff occurs while the source MODEM is transmitting the S signal. The host CPU 20 performs a disconnection process due to timeout. The facsimile communication ultimately fails.

A procedure according to an exemplary embodiment of this disclosure will be described. To solve the problem caused by no detection of the S signal, a timer is employed. The timer is started at a starting time when the recipient MODEM enters a waiting process of the S signal. If the S signal and the transition from the S signal to the Sbar signal are not detected after a predetermined time period (for example 500 msec), the MODEM process forcibly proceeds to a reception process for receiving the PP signal, the sequence B1 signal and the image information data, one after another.

Figure 5:
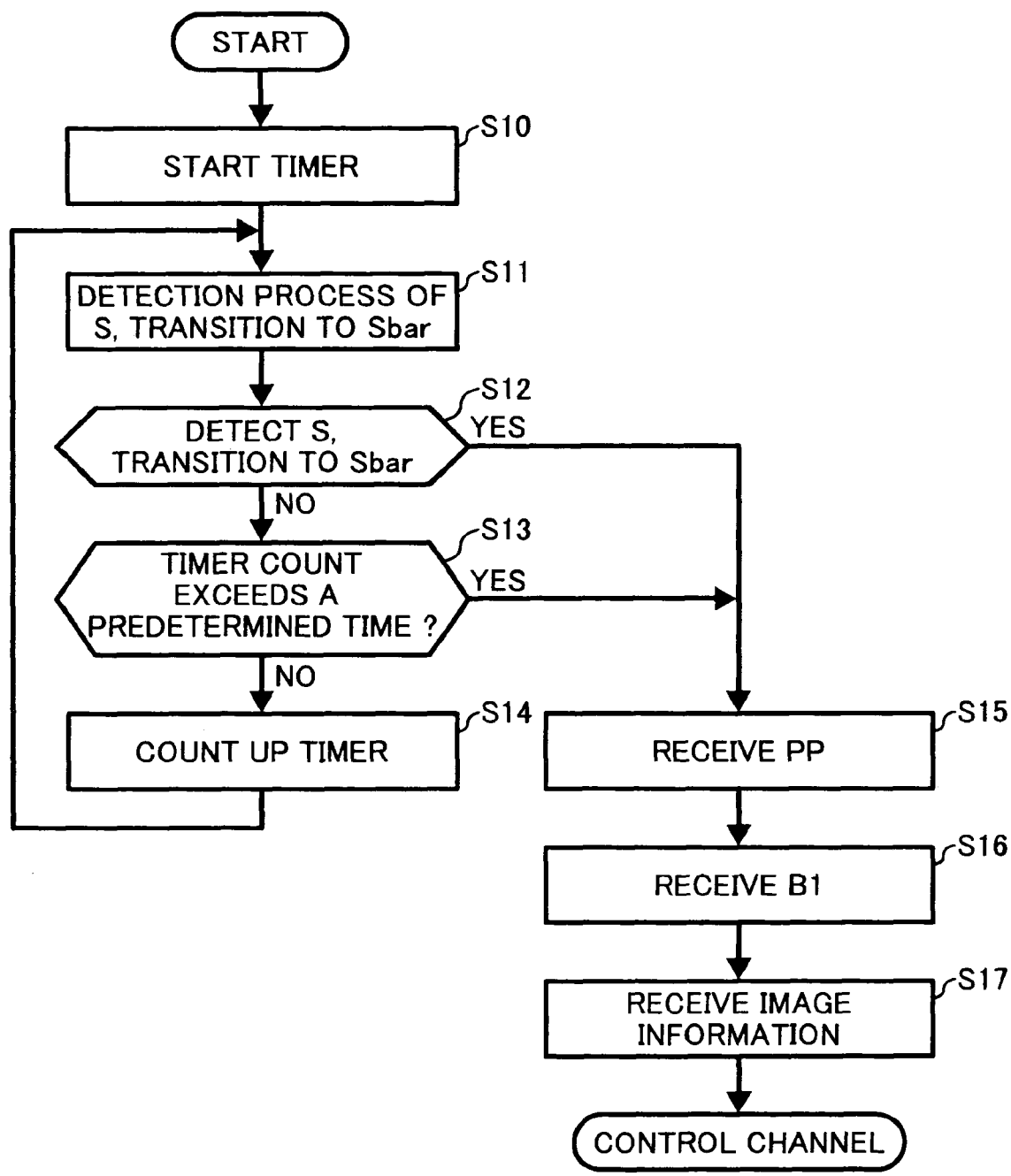
FIG. 5 illustrates a flowchart of a resynchronization process of the primary channel.

FIG. 5 illustrates a flowchart of the resynchronization process of the primary channel performed by the LSI 10 according to an exemplary embodiment of the present disclosure. The resynchronization process is started at a wait timing of the S signal for the resynchronization of the primary channel.

At step S10 of FIG. 5, the timer starts to count. At step S11, the detection of the S signal and the transition detection from the S signal to the Sbar signal is performed.

At step S12, the transition from the S signal to the Sbar signal is checked. When the transition is not detected (step S12, NO), the timer count is checked whether the timer count exceeds a predetermined time (step S13). When the timer count does not exceed the predetermined time (step S13, NO), the timer is counted up at step S14 and the process returns to step S11.

Meanwhile, when the transition from the S signal to the Sbar signal is detected (step S12, YES), the process proceeds to step S15. When the timer count exceeds the predetermined time (step S13, YES), the process similarly proceeds to step S15. The PP signal is received at step S15, the sequence B1 signal is received at step S16, the image information data is received at step S17 and the process then proceeds to the following resynchronization of the control channel.

Namely, if the transition from the S signal to the Sbar signal is detected, the process forcibly proceeds to the receiving process of the PP signal independent from the timer count. Moreover, if the timer count exceeds the predetermined value, the process forcibly proceeds to the receiving process of the PP signal by quitting the detection of the S signal.

When the image data is forcibly treated to be the PP signal and the sequence B1 signal in a middle of the receiving process of the image data, the image data can not be received correctly because the recipient MODEM may not be synchronized with the source MODEM. However, with the resynchronization of the control channel after the transmission of the image information data as shown in FIG. 4, the control information is communicated by receiving signals following the Sh signal or the PPh signal at the following process on the control channel to the image information data. At this timing, the recipient MODEM sends the information indicating that the image data is not received correctly by sending a PPR (Partial Page Response) signal, and requests retransmission of the image data.

The process is then moved to the next process of the resynchronization of the primary channel. If no communication line problem exists, the image information data which was not sent at the previous sequence can be sent again from the source MODEM. Consequently, the facsimile communication will be completed safely.

In this exemplary embodiment, the predetermined time is defined to be 500 msec. However, 200 msec may be long enough to be set because a no-sound period is normally 70+−50 msec. For this reason, it is possible to set a default time to be 500 msec and the host CPU 20 may change the time later. The timer may be hardware, or may employ a configuration which counts in accordance with a sampling interruption from the CODEC 30.

For example, if a sampling frequency is fs=9600 Hz, it may be counted by adjusting with a sampling interruption which is n×(1/9600)×1000 msec. Even if an unintentional instant shutoff occurs while the S signal and the Sbar signal are being detected, the communication may not be disconnected and the image data can be received continuously.

FIG. 6 illustrates a facsimile apparatus according to an exemplary embodiment of the present disclosure. The facsimile apparatus includes an image reading unit 60, an image recording unit 70, an information compression/decompression unit 80 and a MODEM device 90. The image reading unit 60 reads an image on a document paper and obtains an image information.

The information compression/decompression unit 80 provides data to the MODEM device 90 by performing a compression process which reduces redundancies included in the image data which is supplied from the image reading unit 60. Further, the information compression/decompression unit 80 provides data to the image recording unit 70 by performing a decompression process which extracts the original data from the compressed image data which is supplied from the MODEM device 90.

The image recording unit 70 records and replays the image information data as original data. The MODEM device 90 is the facsimile MODEM device of FIG. 1 to 4.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments and examples may be combined with each other and/or substituted for each other within the scope of this disclosure and appended claims.

This patent specification is based on Japanese patent application, No. 2005-230812 filed on Aug. 9, 2005 in the Japan Patent Office, the entire contents of which are incorporated by reference herein.

What is claimed is:

1. A MODEM device, comprising:
    a detector configured to detect a synchronization signal transmitted from a source MODEM in a resynchronization process of a primary channel; and
    a timer configured to count up starting from a beginning of a detection of the synchronization signal and send information to forcibly move into a receiving mode for receiving image data when a time period from the beginning to a completion of the detection of the synchronization signal exceeds a predetermined time period.

2. The MODEM device of claim 1, wherein the image data is compressed and decompressed based on a half-duplex channel communication.

3. The MODEM device of claim 1, wherein the detector detects a S synchronization signal and an inversion Sbar of the synchronization signal in the resynchronization process of the primary channel.

4. A facsimile apparatus which includes the MODEM device of claim 1.

5. The MODEM device of claim 1, wherein following the resynchronization process of the primary channel, the detector detects a control channel synchronization signal Sh for resynchronization of a control channel, and if the image data is received correctly by the MODEM device, the MODEM device transmits a message confirmation signal to a source of the image data.

6. The MODEM device of claim 1, wherein following the resynchronization process of the primary channel, the detector detects a control channel synchronization signal Sh for resynchronization of a control channel, and if the image data is not received correctly by the MODEM device, the MODEM device transmits a partial page response signal to an image data source to request retransmission of the image data by the image data source.

7. The MODEM device of claim 1, wherein following the resynchronization process of the primary channel, the detector detects a control channel synchronization signal Sh for resynchronization of a control channel, and if a plurality of document pages is being transmitted in a page transmission mode, the resynchronization of the primary channel, reception of image data and resynchronization of the control channel is repeated for another page of the document pages.

8. A method for controlling a MODEM device using half-duplex channel communication, the method comprising the steps of:
    starting a timer to count up from a beginning of a detection of a synchronization signal;
    detecting an S synchronization signal and a transition from the S synchronization signal to an inversion Sbar of the synchronization signal;
    checking an event of the transition from the S synchronization signal to the inversion Sbar of the synchronization signal;
    moving forcibly into a receiving mode to receive image data when a period starting from the detection of the S synchronization signal to an instant before transition to the inversion Sbar of the synchronization signal exceeds a predetermined time period; and
    receiving the image data after receiving a sequence signal PP and a sequence B1 signal during the receiving mode.

9. A MODEM device, comprising:
  detector means for detecting a synchronization signal transmitted from a source MODEM in a resynchronization process of a primary channel; and
  timer means for starting to count up from a beginning of a detection of the synchronization signal and for sending information to forcibly move into a receiving mode for receiving image data when a period from the beginning to a completion of the detection of the synchronization signal exceeds a predetermined time period.

10. The MODEM device of claim 9, wherein the image data is compressed and decompressed for a half-duplex channel communication.

11. The MODEM device of claim 9, wherein the detector means detects a S synchronization signal and an inversion Sbar of the synchronization signal in the resynchronization process of the primary channel.

12. The MODEM device of claim 9, wherein following the resynchronization process of the primary channel, the detector means detects a control channel synchronization signal Sh for resynchronization of a control channel, and if the image data is received correctly by the MODEM device, the MODEM device transmits a message confirmation signal to a source of the image data.

13. The MODEM device of claim 9, wherein following the resynchronization process of the primary channel, the detector means detects a control channel synchronization signal Sh for resynchronization of a control channel, and if the image data is not received correctly by the MODEM device, the MODEM device transmits a partial page response signal to an image data source to request retransmission of the image data by the image data source.

14. The MODEM device of claim 9, wherein following the resynchronization process of the primary channel, the detector means detects a control channel synchronization signal Sh for resynchronization of a control channel, and if a plurality of document pages is being transmitted in a page transmission mode, the resynchronization of the primary channel, reception of image data and resynchronization of the control channel is repeated for another page of the document pages.

* * * * *